Patented June 2, 1936

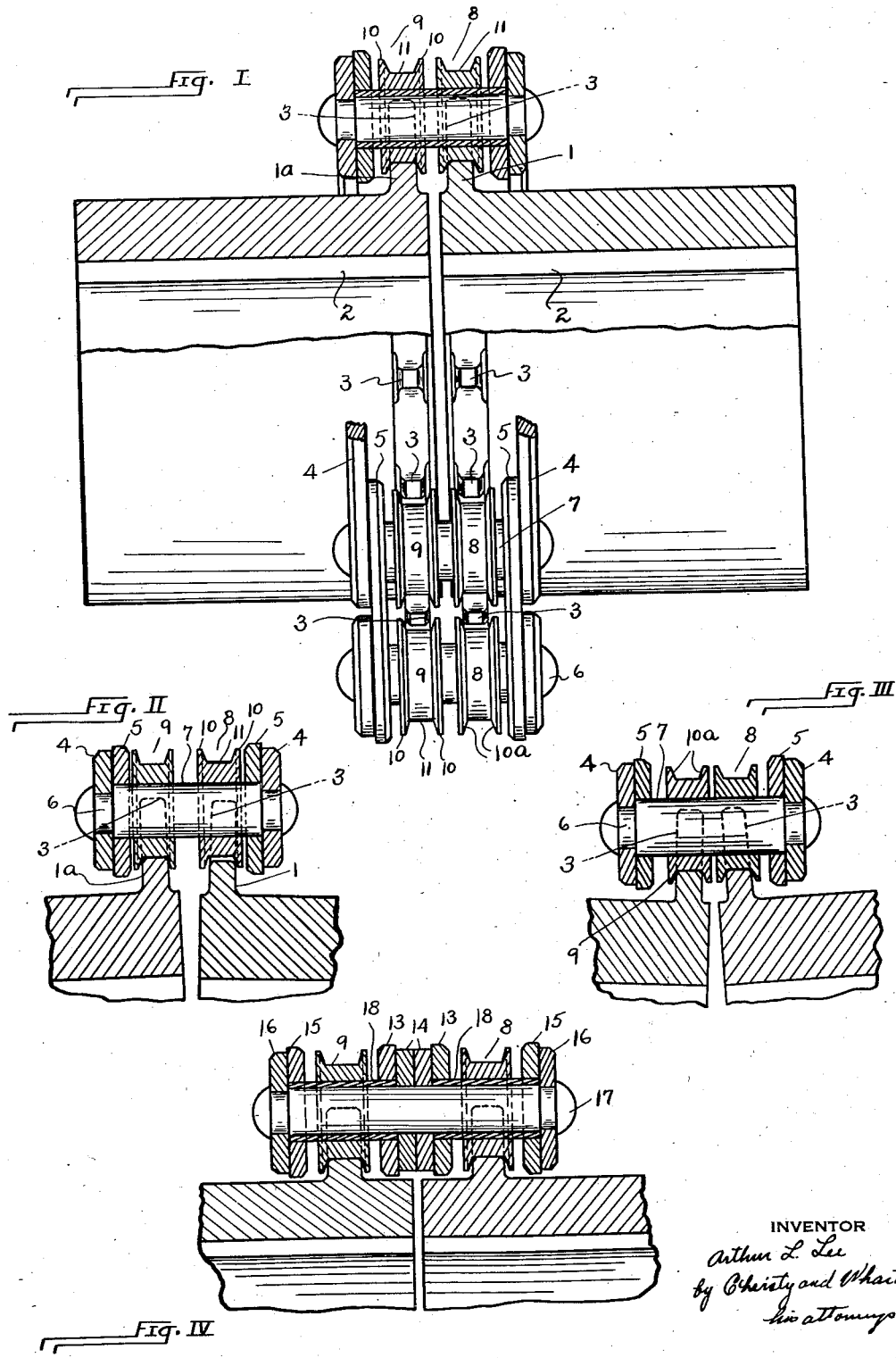

2,042,608

REISSUED

UNITED STATES PATENT OFFICE 2,042,608

FLEXIBLE COUPLING

Arthur L. Lee, Oakmont, Pa.

Application June 27, 1935, Serial No. 28,624

6 Claims. (Cl. 64—19)

This invention relates to a flexible coupling of the roller chain type for the driving interconnection of two shafts arranged in approximate axial alignment.

For the interconnection of a driving and driven shaft, it is usual to utilize flexible couplings comprising sprockets mounted on the adjacent terminals of the shafts, and a sprocket chain interconnecting the two sprockets. Such flexible couplings compensate for slight angular misalignment of the shafts, and also for slight offset misalignment of the shafts, since the sprocket teeth may slide upon rotatable bushings, or rollers, carried by the transverse elements of the sprocket chain and into an inclined position with respect to the axes of the transverse elements. At low speeds such flexible couplings, as commonly made, are relatively satisfactory. At high speed, however, the relative sliding movement between the sprocket teeth and the bushing, or roller, on the transverse element of the sprocket chain, and the inclination of the sprocket teeth, causes rapid destruction of the sprocket teeth. This is highly disadvantageous since the sprockets so used are relatively expensive, and since machinery driven through the flexible coupling must remain idle through the relatively extended interval of time required for the removal of a worn sprocket and the mounting of a fresh one. Various expedients, more or less successful, have been proposed or utilized to overcome this disadvantage of flexible chain couplings.

The object of my invention is to provide a flexible chain coupling, in which the teeth of the shaft-carried sprockets, interconnected by the chain, are protected from destructive wear by elements of the chain which assume the friction produced by misalignment of the shafts which carry the sprockets.

Stated more generally, the object of my invention is to provide a high-speed flexible chain coupling, in which the sprockets of the coupling have a long working life.

In the accompanying drawing Fig. I is a view, partly in elevation and partly in section, showing my flexible chain coupling with the sprocket elements of the coupling in the relative position in which they would lie if mounted terminally on shafts positioned in accurate terminal alignment with each other, and showing the flexible chain of the coupling interconnecting the two sprocket elements for interconnection of the shafts upon which they are concentrically mounted.

Fig. II is a fragmentary, sectional view through the sprockets and chain of my flexible coupling, illustrating a position assumed by the parts in a condition of angular, axial misalignment of the shafts, and illustrating also a condition caused by an axially offset misalignment of the shafts.

Fig. III of the drawing is a fragmentary, sectional view through the sprockets and chain of my coupling, illustrating the position of the parts assumed under a different condition of angular, axial misalignment of the shafts upon which the sprockets are mounted.

Fig. IV is a fragmentary, sectional vew through two sprockets and the interconnecting chain therefor, illustrating the adaptation of my invention to a flexible chain coupling of the double chain type.

Referring to Figs. I to III, inclusive, of the drawing, reference numerals 1 and 1a designate the sprockets which are mounted terminally on the shafts which are to have end interconnection. Each of the sprockets 1 and 1a is formed as a tubular hub, having interiorly thereof a key-way 2 for fixed mounting of the sprocket on its associated shaft. Adjacent its forward terminal, each of the sprocket bodies carries peripherally arranged and uniformly spaced sprocket teeth 3.

Primarily, the sprocket chain cooperating with the teeth on both sprockets, and thereby providing a driving interconnection between the shafts on which the sprockets are carried, is of common form. It thus comprises longitudinal connecting links 4 and 5, and transverse pins 6, which may be riveted outwardly of the outer connecting links 4. Each of the transverse elements, or pins, 6 has thereon a bushing 7.

On the bushings 7 I mount rollers 8 and 9, arranged to be contacted, respectively, by the teeth of the two sprockets. The length of the transverse pin and bushing between the two inner link elements 5 of the assembly, and the width of the rollers 8 and 9, is such as to leave a substantial space between the rollers and beyond the outer faces of each, when the shafts to which the coupling is applied are in accurate, axial alignment with each other. The rollers 8 and 9 are freely mounted on bushings 7 for transverse movement therealong, as well as rotation thereon.

It will be noted that the rollers are spool-shape, having each spaced peripheral flanges 10, to provide a channel 11 in which sprockets may lie. There is thus an engagement between the sprocket teeth and the rollers, which tends to produce transverse movement of the rollers on the bushing 7 with the sprocket teeth upon any change in the relative angular position of the sprockets. Upon axial misalignment of the shafts carrying the sprockets, the sprocket teeth do not, therefore, slide in direct contact with the pin 6, or its surrounding bushing 7. On the contrary, the sprocket teeth being engaged by the concave, peripheral surfaces of the rollers, changed angular position of the sprockets causes a transverse shifting movement of the rollers, without sliding contact between the sprocket teeth 3 and the bushing 7. This obviates such frictional wear upon the sprocket teeth as would tend to wear away the body of the teeth.

Fig. II of the drawing illustrates angular, axial misalignment of the shafts carrying the sprockets, which, in the plane in which the view is taken, causes the rollers 8 and 9 to move oppositely along the transverse element, or pin, 6. Referring particularly to the sprocket 1a, and to the roller 9 associated with it, it will be seen that the position of the sprocket tooth 3 in the channel 11 of the roller has caused the roller to shift its position, the change in angular position of the sprocket being compensated by outward movement of the roller 9 along the transverse element. This same figure of the drawing represents the condition existing upon an offset misalignment of the shafts, as well as an angular misalignment of the shafts. Referring specifically to the sprocket 1, and the roller 8 by which the teeth of that sprocket are engaged, it will be seen that this roller 8 has also shifted along the transverse element in compensation for angular misalignment of the shaft which carries the sprocket. Since, however, this sprocket 1 is also slightly offset from the true line of centers, there is a tendency for the sprocket tooth to rock in the concavity of the roller, not only assuming a position of angularity with respect to the roller, but also lying slightly out of contact with the base of the roller concavity, or channel, 11.

It should be noted that this offset misalignment is a condition which, in the absence of free tooth-embracing rollers, produces such relative movement between the sprocket teeth and the bushings, or rollers, with which they are in contact, that the sprocket teeth are destroyed with particular rapidity. In order that there may be a rocking movement between the sprocket teeth and the rollers with which they engage, the flanges, or collars, 10 are formed with their inner surfaces 10a tapering outwardly, and the edges of the sprocket teeth 3 are slightly bevelled. Rocking movement between the sprocket teeth and rollers therefor, tends merely to increase the bevel at the edges of the sprocket teeth, and as this bevelling action is not a progressive one it does not lead to the destruction of the sprocket, as at a sharpening of the sprocket tooth edges.

Fig. III shows an angular, axial misalignment between the shafts and sprockets, opposite in sense to that illustrated in Fig. II. Disregarding the illustration of offset misalignment, it may be considered as a condition existing in the region of the coupling, diametrically opposite the region shown in Fig. II. In this condition the inclination of the sprockets has shifted the two rollers 8 and 9 toward each other, the sprocket teeth 3 being relieved of wear by the shifting.

It should be explained that the angularity of the sprockets shown in Figs. II and III is greatly exaggerated over any anticipated condition which the flexible coupling is designed to remedy. The exaggerated showing of Figs. II and III not only illustrates more clearly the shifting of the tooth-embracing rollers caused by misalignment of the shafts, but also serves to illustrate graphically the conditions which result in rapid destruction of the sprocket teeth in the absence of the tooth-embracing, shiftable rollers of my coupling.

In Fig. IV of the drawing, the assembly is effectively that shown in Figs. I to III inclusive. In this modification, however, there is shown a double chain, which has central links 13 and 14, as well as the outer links 15 and 16, corresponding to the links 4 and 5 of the structure illustrated in Figs. I to III of the drawing. In this modification the transverse element, or pin, 17 carries two individual bushings 18 upon which the rollers 8 and 9 are freely mounted. In this modification of my coupling the transverse pins 17 must be of increased length, in order to provide clearance to both sides of each roller to permit shifting of the rollers along the transverse element.

This modification is shown merely to illustrate the fact that my invention may be embodied in a flexible chain coupling of the double chain type, as well as in one of the single chain type. It has, as an embodiment of my invention, no individual functional import. This is for the reason that the advantage of a double chain, as distinguished from a single chain in a coupling of this type, resides in the fact that the central links prevent the teeth of the two connected sprockets from coming into contact with each other. Since in either modification of my invention the sprocket teeth are embraced by the shiftable concave rollers, there is thus in the single chain embodiment of my invention no possibility of actual contact between the two sprockets.

In actual commercial use, I have demonstrated the marked superiority of my flexible chain coupling, which was invented by me because of the difficulty experienced with couplings of this general type as applied to the driving of mining machines at high speed. In such work, I found it impossible to utilize flexible couplings with single rollers, or bushings, for more than two months without sprocket replacement. Under identical conditions the sprockets of a coupling having two rollers, made in accordance with the best prior practice, were destroyed within a period of slightly less than six months; but, under identical conditions, a flexible coupling made in accordance with my invention has been in continuous satisfactory service for more than eighteen months without appreciable detriment to the sprockets of the coupling.

As noted above, the long life of the sprockets, forming an element of a coupling made in accordance with my invention, may be attributed to the fact that the greater proportion of the friction due to misalignment of the shafts carrying the sprockets is assumed by the shiftable rollers, which embrace the sprocket teeth, and which thereby assume the wearing effect of shifting movement and of angular contact to which the sprocket teeth themselves would otherwise be subjected.

It is, of course, possible to have a single roller of each pair shiftable transversely of the shaft and arranged to engage the sprocket teeth with which it is aligned. Such arrangement, while definitely inferior to the arrangement shown and described, would, however, provide a flexible chain coupling definitely superior to any coupling of the type as previously known to the art.

I claim as my invention:

1. In a flexible coupling for two shafts arranged in approximate axial alignment with each other comprising a toothed sprocket on each of the shafts, and a sprocket-encircling chain formed of transverse elements with connecting links therebetween; rollers mounted in pairs on said transverse elements and associated respectively with the two sprockets of the coupling, at least one of each pair of rollers being free on the transverse elements and dimensioned to provide space for movement of the roller along its transverse element and having a peripheral sprocket tooth-embracing concavity, providing engagement between the roller and a sprocket tooth and tending to cause shifting movement of the roller on its transverse element under force exerted on the roller by its associated sprocket teeth in changing relative angular position of the sprockets.

2. In a flexible coupling for two shafts arranged in approximate axial alignment with each other comprising a toothed sprocket on each of the shafts, and a sprocket-encircling chain formed of transverse elements with connecting links therebetween; rollers mounted in pairs on said transverse elements and associated respectively with the two sprockets of the coupling, said rollers being free on the transverse elements and dimensioned to provide space for movement of the rollers along the transverse elements, and peripheral sprocket tooth-embracing concavities in the said rollers providing engagement between the rollers and the sprocket teeth and tending to cause shifting movement of the rollers on their transverse elements under force exerted on the roller by the sprocket teeth in changing relative angular position of the sprockets.

3. In a flexible coupling for two shafts arranged in approximate axial alignment with each other comprising a toothed sprocket on each of the shafts, and a sprocket-encircling chain formed of transverse elements with connecting links therebetween; rollers mounted in pairs on said transverse elements and associated respectively with the two sprockets of the coupling, at least one of each pair of rollers being free on the transverse elements and dimensioned to provide space for shifting movement of the roller along the transverse elements, and means providing engagement between said shiftable roller and the teeth of the sprocket associated with it and tending to cause shifting movement of the roller on its transverse element under force exerted on the roller by its associated sprocket teeth in changing relative angular position of the sprockets.

4. In a flexible coupling for two shafts arranged in approximate axial alignment with each other comprising a toothed sprocket on each of the shafts, and a sprocket-encircling chain formed of transverse elements with connecting links therebetween; rollers mounted in pairs on said transverse elements for cooperation respectively with the teeth of the two shaft-carried sprockets, said rollers being free on said transverse elements and dimensioned to provide space for movement of the rollers along the transverse elements, and means providing engagement between the said rollers and the teeth of the sprockets associated with them and tending to cause shifting movement of the rollers on the transverse elements under force exerted on the rollers by the sprocket teeth in changing relative angular position of the sprockets.

5. In a flexible coupling for two shafts arranged in approximate axial alignment with each other comprising a toothed sprocket on each of the shafts, a sprocket-encircling chain formed of transverse elements with connecting links therebetween, rollers mounted in pairs on said transverse elements for cooperation respectively with the teeth of each shaft-carried sprocket, at least one roller of each pair being free to shift along the transverse element on which it is mounted, said shiftable roller and its associated sprocket being constructed to provide resistance to transverse movement of the sprocket teeth on the roller greater than the resistance to transverse movement between the roller and the transverse element on which it is mounted, whereby the roller is shifted transversely under force exerted on it by its associated sprocket teeth in changing relative angular position of the sprockets.

6. In a flexible coupling for two shafts arranged in approximate axial alignment with each other comprising a toothed sprocket on each of the shafts, a sprocket-encircling chain formed of transverse elements with connecting links therebetween, rollers mounted in pairs on said transverse elements for cooperation respectively with the teeth of each shaft-carried sprocket, the said rollers being free to shift along the transverse elements on which they are mounted, said shiftable rollers and their associated sprockets being constructed and arranged to provide resistance to transverse movement of the sprocket teeth on the rollers greater than the resistance to transverse movement between the rollers and the transverse elements on which they are mounted, whereby the rollers are shifted transversely under force exerted on them by the sprockets in changing relative angular position of the sprockets.

ARTHUR L. LEE.